United States Patent [19]
Keith

[11] Patent Number: 5,519,439
[45] Date of Patent: May 21, 1996

[54] METHOD AND APPARATUS FOR GENERATING PREVIEW IMAGES

[75] Inventor: Michael Keith, Beaverton, Oreg.

[73] Assignee: Intel Corporation, Santa Clara, Calif.

[21] Appl. No.: 268,958

[22] Filed: Jun. 30, 1994

[51] Int. Cl.⁶ .................................................... H04N 11/02
[52] U.S. Cl. ........................ 348/396; 348/390; 345/155; 345/199
[58] Field of Search .................................. 348/13, 14, 15, 348/16, 17, 18, 390, 384, 398; 345/153, 154, 155, 199; H04N 7/12, 7/14, 7/15, 11/02

[56] References Cited

U.S. PATENT DOCUMENTS 4,774,562  9/1988  Chen et al. ............................... 348/396
5,325,109  6/1994  Duckworth ............................... 345/155
5,351,085  9/1994  Coelho et al. ........................... 348/396
5,363,138  11/1994  Hayashi et al. ......................... 348/390
5,381,180  1/1995  Keith ....................................... 348/396
5,384,582  1/1995  Keith ....................................... 345/155
5,432,554  7/1995  Nickerson et al. ...................... 348/396

Primary Examiner—James J. Groody
Assistant Examiner—Chris Grant
Attorney, Agent, or Firm—William H. Murray; John V. Silverio

[57] ABSTRACT

A local subsampled color video signal is converted directly to a CLUT 8 format for local display as a preview image without being locally compressed and decompressed, while the same signal to be transmitted to a remote locate is compressed. The local preview display is thus generated using relatively little computer time and hardware, while still being of adequate quality for preview purposes.

22 Claims, 2 Drawing Sheets

METHOD AND APPARATUS FOR GENERATING PREVIEW IMAGES

BACKGROUND OF THE INVENTION

This invention relates to color video transmission systems, and more particularly to such systems requiring a local display of the transmitted signal (as, for example, in video conferencing systems).

A color video camera typically generates three signals indicative of the red, green, and blue components of the scanned scene. The digitized version of these signals is referred to as "RGB24." In order for these signals to be kept synchronized during transmission, they are normally encoded into one of several "composite" formats. Generally, these composite formats separate the picture information into a "luminance" signal and into two color difference "chrominance" signals.

For example, the National Television Systems Committee ("NTSC") has a standardized composite format called "YIQ," wherein Y represents the luminance level, and I and Q represent the two color difference chrominance signals. Another similar composite format is the "PAL" format, which originated in Europe, and which produces a different set of chrominance signals "U" and "V" so that this format is often referred to as "YUV" The "YUV" format is normally used in Digital Video Interactive ("DVI") technology due largely to its compatibility with current international standardization efforts in the area of digital video systems.

Once a digitized image has been put into a YUV format, for example YUV24 format, (e.g. with 8 bits/pixel for each of the three components), it is often desirable to employ "color subsampling" to reduce the number of bits of binary data needed to represent the picture signal YUV24 is a known format for video data associated with the PAL (Phase Alternating Line) color television system. A digital YUV24 pixel value (8 bits for each of the Y, U and V components) is directly calculable from a digital RGB24 pixel value (8 bits for each of the red, green and blue components) using the following equations: Y=0.30R+0.59G+0.11B; U=0.62R−0.52G−0.10B; V=−0.15R −0.29G+0.44B. For instance "YUV 9 subsampling" involves assigning one pixel's color information to 15 adjacent pixels so that 16 pixels' color information is contained in only 16 bits of binary data. By simultaneously keeping the luminance signal data in the 8 bit per pixel format the total number of bits/pixel for this subsampled arrangement is only 9 instead of the original value of 24. This approach still yields an acceptable color picture, because the human eye has relatively poor acuity for detecting color changes in an image (as opposed to luminance changes). So for many practical applications the YUV9 format is quite useful.

It should be noted that the YUV9 format allows for inclusion all of the original RGB24 colors (i.e. $2^{24}$=16,777, 216 of them), which are also the possible YUV24 colors, but just in a different format. So the YUV9 format has all these colors, but is limited to displaying them in 16 pixel groupings, which results in four times less distinct color transitions in both the x and y directions of a video display. Once again, in most uses this is not a major problem due to the limitations of the human eye.

Processing these large variety of colors requires a large amount of computer capacity and computer time. It would therefore be desirable, in certain applications such as local display of preview images, to employ a simplified technique to produce color images with a much smaller number of basic colors included that would nonetheless serve the desired purpose quite well.

It is therefore an object of the instant invention to provide a novel simplified technique for creating an acceptable local preview image in an image transmission system.

It is a further object of the instant invention to produce an acceptable local preview image without the need for local decompression of that image at the transmitting station.

It is yet a further object of the invention to accomplish the production of an acceptable local preview image with little local processing needed other than simple memory moves in a look-up table.

SUMMARY OF THE INVENTION

This invention replaces the common technique for displaying a local preview image by eliminating the need for a local decompression step prior to local display. The preview image is different from that which is transmitted to remote locations in that it is composed of a CLUT-8 format color picture, whereas the transmitted signal is in a compressed YUV9 format. The preview image therefore does not contain the broad spectrum of possible colors as generally does the transmitted image, but it is quite acceptable for preview purposes and is generated with much less computer hardware and processing time.

The uncompressed subsampled YUV9 local image signal is used as an input signal to a simple YUV9 to CLUT8 converter that produces the required data for local preview viewing, while at the same time the same subsampled YUV9 signal is compressed by well-known compression techniques for transmission to remote locations. The uncompressed YUV9 to CLUT8 local conversion process is much simpler and less expensive that would be a local decompression of the compressed YUV9 signal. The compressed YUV9 signals each comprise three eight bit words which are distributed throughout sixteen adjacent pixels. The technique of the instant invention incudes dropping the three least significant bits of each Y word and dropping the four least significant bits of each of the U and V words for each 24 bit color signal. This reduces the number of different input possibilities to a practical number of addresses to use in a computer look-up table. These possibilities are then mapped to a CLUT8 index of 256 possible colors. How the colors for this mapping are chosen is determined mostly by the type of local image that is being sent. So, for example, the CLUT index (or "palette") for human faces would be chosen differently from a palette for a landscape scene. As the input data is processed to pick the appropriate CLUT color for each adjacent 4×4 group of 16 pixels, the picked colors are then transmitted directly to the local preview screen. In this manner the local preview image is produced without the need for implementation of a local video decompression process.

BRIEF DESCRIPTION OF THE DRAWING

The reader's understanding of a practical implementation of a preferred embodiment of the invention will be enhanced by reference to the following detailed description taken in conjunction with the drawing figures, wherein.

DETAILED DESCRIPTION

Figure 1:
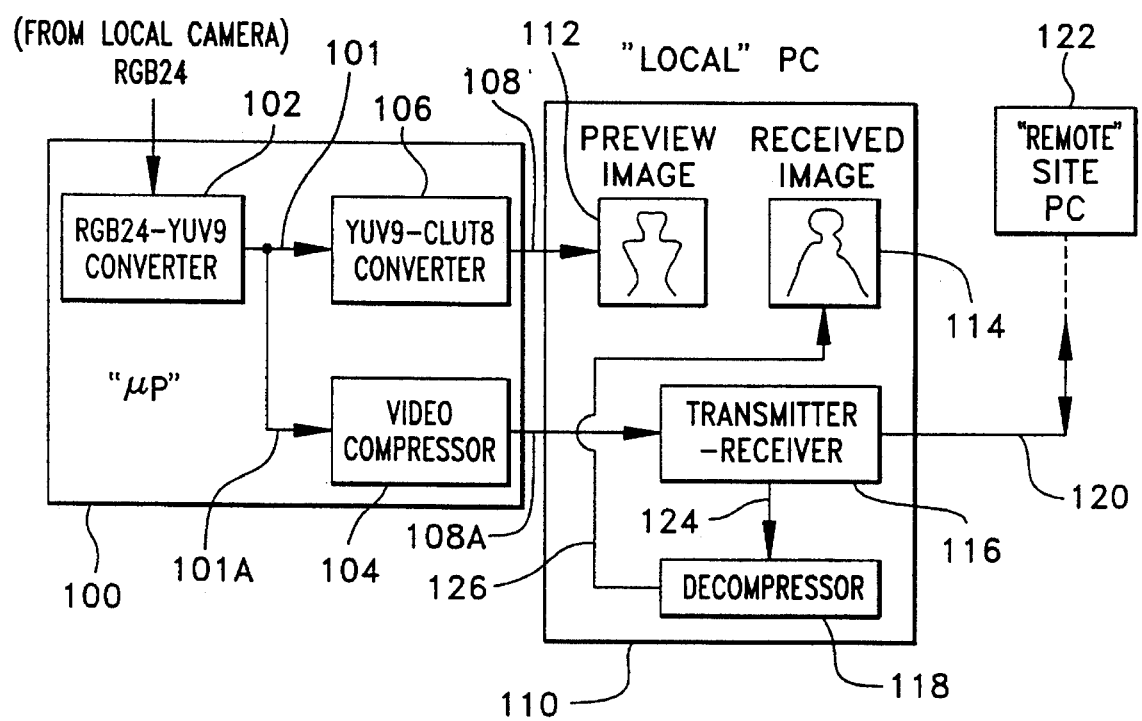
FIG. 1 shows a block diagram of a preferred embodiment for efficient local previewing.

Referring now to FIG. 1, therein depicted is a block diagram of a preferred embodiment of the instant invention. Shown as block 100 is a video digitizing and compression board well-known (in part) to those skilled in the art as a microprocessor-controlled (e.g. Intel Pentium® processor) means for converting an RGB24 color video signal (emanating from a color video camera, not shown) to a compressed YUV9 composite video signal suitable for transmission along a video data communications channel.

The previously-known part of block 100 is therefore the RGB24-YUV9 converter 102 and video compressor 104 (which receives its input signal from converter 102 via video bus 101A). The novel part of block 100 comprises the YUV9-CLUT8 converter 106 (which receives, via video bus 101, the same input signal from converter 102 as does video compressor 104). Converter 106 produces a display-ready uncompressed video output signal that is transmitted along video bus 108 to local personal computer (PC) 110 for display as preview image 112. In this manner no local decompression is needed to produce preview image 112. Thus a significant savings in reduced computer time and reduced hardware complexity is achieved.

The compressed YUV9 video signal is transmitted along bus 108A to transmitter-receiver 116 contained in local PC 110 for subsequent transmittal along two-way video data channel 120 to remote sites (e.g. PC 122).

Transmitter-receiver 116 also receives compressed video signals via data channel 120 which are sent along bus 124 to video decompressor 118 which in turn transmits a display-ready color video signal along bus 126 for display as received image 114.

Those skilled in the art will appreciate that the YUV9-CLUT8 conversion process as accomplished by converter 106 (and hereinafter described in detail) comprises a relatively simple method that can be efficiently implemented by a microprocessor requiring, for the most part, only memory moves. Since such memory moves are relatively quickly and simply achieved (vis-a-vis the complexities of video decompression), this novel approach for generating a preview image comprises, in Applicant's view, a preferred technique as compared to previously-known methods for preview image generation.

Figure 2:
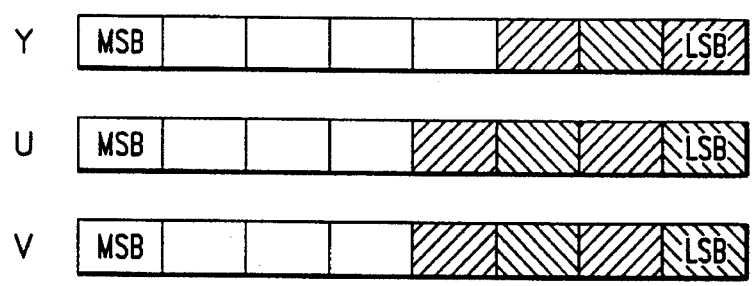
FIG. 2 depicts the color truncation step of converting from YUV9 to a 13-bit index.
Figure 3:
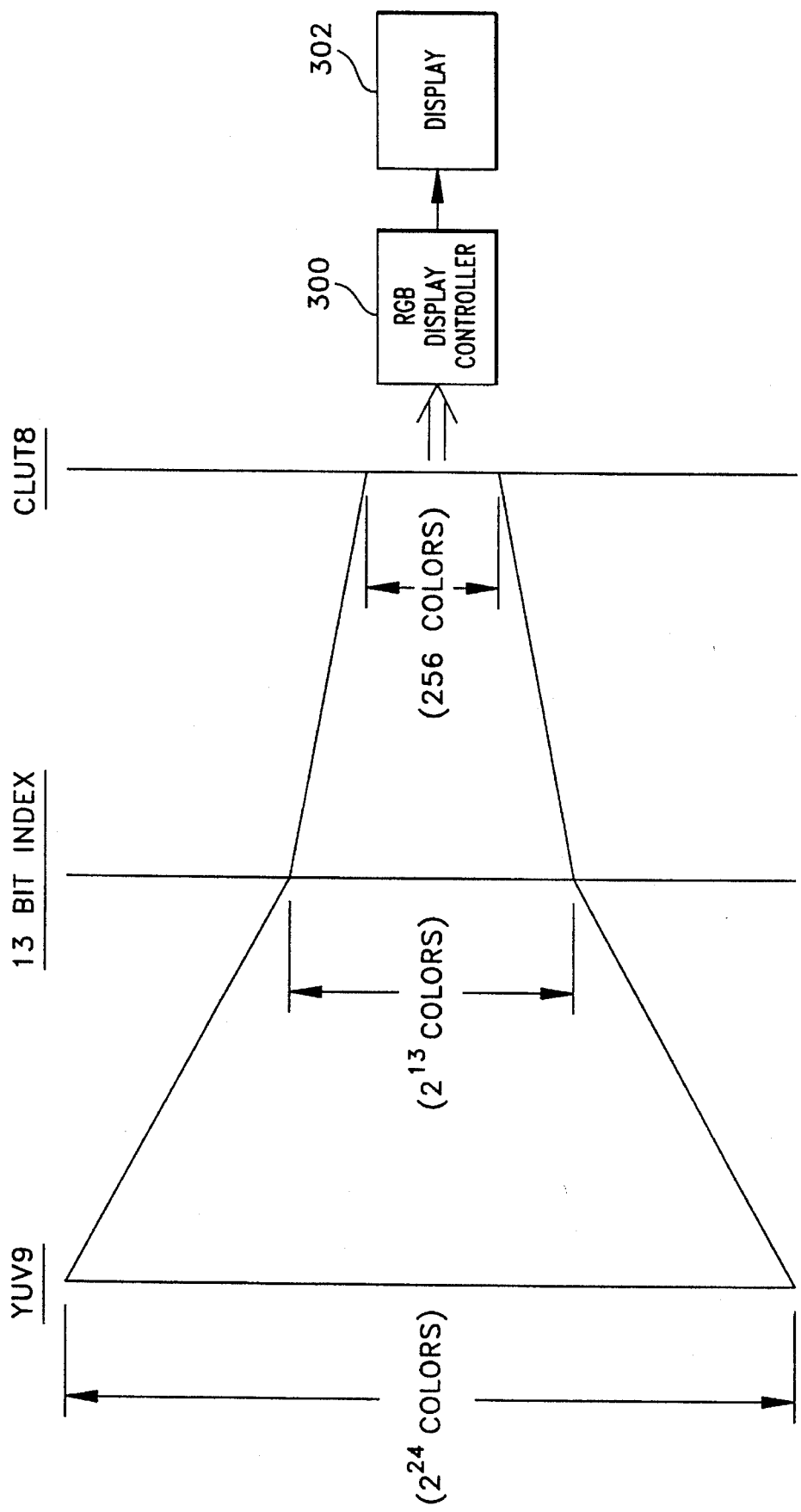
FIG. 3 is a diagrammatic representation of the process of reducing from the YUV9 colors to a palette of 256 CLUT8 colors.

The above-mentioned local YUV9-CLUT8 conversion process is accomplished efficiently in the following manner, the ensuing explanation of which will be more readily understood by concurrent reference to FIGS. 2 and 3 hereof:

The YUV9 data for each pixel contains 24 bits of binary information (even though 16 bits thereof, i.e. the U and V data, are shared in adjacent 4×4 groupings of pixels in the "subsampling" process used to produce the YUV9 signals). In order to reduce the number of possible colors (i.e. over 16 million) to a manageable quantity, it is useful to truncate the U and V 8-bit words to just their four most significant bits as shown in FIG. 2. This coarsens the gradations between hues of color available by a significant factor, but still allows for a broad spectrum of possible hues.

For human viewing purposes, the Y word is more important, due to the eye's relatively higher sensitivity to changes in luminance as compared to color changes. Therefore, Applicant considers it to be desirable to only truncate the Y word to its five most significant bits as shown in FIG. 2. Thus the shading gradations for the various hues are relatively finer than the gradations in the hues themselves.

The above-described truncation processes are accomplished within the system processor by simple data manipulation techniques (i.e. "memory moves") well-known to those skilled in the art of computer system design and programming. The resulting truncated data represents a spectrum of different combinations of shades and hues of colors as shown in FIG. 3. These values are then used as an index to a color look-up table ("CLUT") having a palette of 256 artfully-chosen colors that are suitable for the particular type of image expected to be previewed. Once again, this CLUT output provides the data in an RGB format to the RGB display controller 300 which in turn, upon command, sends the data to the local display screen. The above-described process of converting from an index to a CLUT output is also accomplished with simple memory moves which employ very little control processing unit ("CPU") time, relative to the time that would otherwise be required to implement decompression of a compressed YUV9 color signal.

The above-described particular embodiment has been provided for illustrative purposes, but Applicant's invention is not limited thereto; rather, the scope of Applicant's invention is defined by the appended claims and their fair equivalents.

What is claimed is:

1. For a digital video transmission system comprising a local station and one or more remote stations, wherein a locally-generated video signal that is locally-compressed for transmission to said one or more remote stations is also concurrently converted to a locally-displayed preview image, a method for producing said preview image without the need for a local decompression process, comprising the steps of:

(A) converting said video signal from a local camera output format to a multiple-component composite digital video signal;

(B) truncating the components of said composite digital video signal;

(C) using the remaining truncated components of said composite digital video signal as an index to a computer-stored look-up table; and (D) employing the output of said computer-stored look-up table to display said preview image on a local video display.

2. The method of claim 1, wherein said locally-generated video signal is a color video signal.

3. The method of claim 2, wherein said color video signal is in an RGB24 format.

4. The method of claim 3, wherein said composite digital video signal is in a YUV24 format.

5. The method of claim 3, wherein step (A) includes the conversion of said composite digital video signal into a subsampled YUV format.

6. The method of claim 5, wherein the format of said subsampled digital video signal is a YUV9 format.

7. The method of claim 4, wherein said composite digital video signal is truncated by deleting the last 3 bits of the Y component and by deleting the last 4 bits of each of the U and V components.

8. The method of claim 5, wherein said composite digital video signal is truncated by deleting the last 3 bits of the Y component and by deleting the last 4 bits of each of the U and V components.

9. The method of claim 6, wherein said composite digital video signal is truncated by deleting the last 3 bits of the Y component and by deleting the last 4 bits of each of the U and V components.

10. The method of claim 1, wherein said computer-stored look-up table comprises a color look-up table.

11. The method of claim 10, wherein said color look-up table comprises a CLUT8 output signal.

12. In a digital video transmission system comprising a local station and one or more remote stations, wherein a locally-generated video signal that is locally-compressed for transmission to said one or more remote stations is also concurrently converted to a locally-displayed preview image, apparatus for producing said preview image without the need for a local decompression process, comprising:

(A) means for converting said video signal from a local camera output format to a multiple-component composite digital video signal;

(B) means for truncating the components of said composite digital video signal;

(C) means for using the remaining truncated components of said composite digital video signal as an index to a computer-stored look-up table; and (D) means for employing the output of said computer-stored look-up table to display said preview image on a local video display.

13. The apparatus of claim 12, wherein said locally-generated video signal is a color video signal.

14. The apparatus of claim 13, wherein said color video signal is in an RGB24 format.

15. The apparatus of claim 14, wherein said composite digital video signal is in a YUV24 format.

16. The apparatus of claim 14, wherein step (A) includes the conversion of said composite digital video signal into a subsampled YUV format.

17. The apparatus of claim 16, wherein the format of said subsampled digital video signal is a YUV9 format.

18. The apparatus of claim 15, wherein said composite digital video signal is truncated by deleting the last 3 bits of the Y component and by deleting the last 4 bits of each of the U and V components.

19. The apparatus of claim 16, wherein said composite digital video signal is truncated by deleting the last 3 bits of the Y component and by deleting the last 4 bits of each of the U and V components.

20. The apparatus of claim 17, wherein said composite digital video signal is truncated by deleting the last 3 bits of the Y component and by deleting the last 4 bits of each of the U and V components.

21. The apparatus of claim 12, wherein said computer-stored look-up table comprises a color look-up table.

22. The apparatus of claim 21, wherein said color look-up table comprises a CLUT8 output signal.

* * * * *